(12) United States Patent
Smorgon et al.

(10) Patent No.: US 6,464,910 B1
(45) Date of Patent: Oct. 15, 2002

(54) INJECTION MOULDING OF LARGE PLASTIC COMPONENTS

(75) Inventors: Victor Smorgon, Laverton North (AU); Lazer Berelovich, Elsternwick (AU)

(73) Assignee: Vicfam Plastics Pty Ltd., Laverton North (AU)

( * ) Notice: Subject to any disclaimer, the term of this patent is extended or adjusted under 35 U.S.C. 154(b) by 0 days.

(21) Appl. No.: 09/446,193

(22) PCT Filed: May 20, 1998

(86) PCT No.: PCT/AU98/00370

§ 371 (c)(1),
(2), (4) Date: May 16, 2000

(87) PCT Pub. No.: WO99/00237

PCT Pub. Date: Jan. 7, 1999

(30) Foreign Application Priority Data

Jun. 26, 1997  (AU) .............................................. PO 7522

(51) Int. Cl.$^7$ .......................... B29C 45/38; B29C 45/77
(52) U.S. Cl. ............. 264/40.5; 264/328.9; 264/328.19; 264/921; 425/146; 425/557; 425/561; 425/566
(58) Field of Search ............................. 264/40.5, 328.1, 264/328.19, 328.9, 921; 425/145, 146, 557–562, 566, 571

(56) References Cited

U.S. PATENT DOCUMENTS

| 2,382,655 | A | * | 8/1945 | Nichols ..................... 264/37.33 |
| 3,819,313 | A | * | 6/1974 | Josephsen et al. ........... 425/560 |
| 3,847,525 | A | * | 11/1974 | Bielfeldt et al. ............. 425/555 |
| 3,861,841 | A | * | 1/1975 | Hanning ..................... 425/146 |
| 3,941,529 | A | * | 3/1976 | Klingebiel ................. 264/45.5 |
| 4,080,147 | A | * | 3/1978 | Dumortier ................... 425/561 |
| 4,473,516 | A | | 9/1984 | Hunerberg |
| 4,784,819 | A | | 11/1988 | Spurr |
| 5,185,119 | A | * | 2/1993 | Schad et al. ............. 264/297.2 |
| 5,192,555 | A | | 3/1993 | Arnott |
| 5,482,663 | A | | 1/1996 | Hammer et al. |
| 5,511,968 | A | | 4/1996 | Guzzini |
| 5,556,582 | A | * | 9/1996 | Kazmer ................. 264/328.12 |
| 6,109,910 | A | * | 8/2000 | Sekido ........................ 425/561 |

FOREIGN PATENT DOCUMENTS

| JP | 55065532 A | 5/1980 |
| JP | 5293867 A | 11/1993 |
| JP | 08276454 A | 10/1996 |

OTHER PUBLICATIONS

"SPI Plastics Engineering Handbook of the Plastics Industry, Inc." 5th Edition Edited by Michael L. Berins, published 1991 by Chapman & Hall (New York) p. 170 column 2 paragraph 2.

* cited by examiner

Primary Examiner—Jill L. Heitbrink
(74) Attorney, Agent, or Firm—Harness, Dickey & Pierce, P.L.C.

(57) ABSTRACT

A system for injection moulding of large plastics components in a single shot comprises an extruder and an accumulator fed from the extruder The accumulator leads into the mould (14) via a mould valve (12) opive, when closed, to close the mould cavity substantially at the mould surface and also to close an outlet (20a) from the accumulator. The valve passage of the mould valve is of relatively large cross-section, typically several centimetres or more which facilitates injection at relatively low pressures and also facilitates passage of stones and other particulate matter which may be present if the extrudate is composed of post-consumer recycled plastics.

13 Claims, 2 Drawing Sheets

INJECTION MOULDING OF LARGE PLASTIC COMPONENTS

Figure 1:
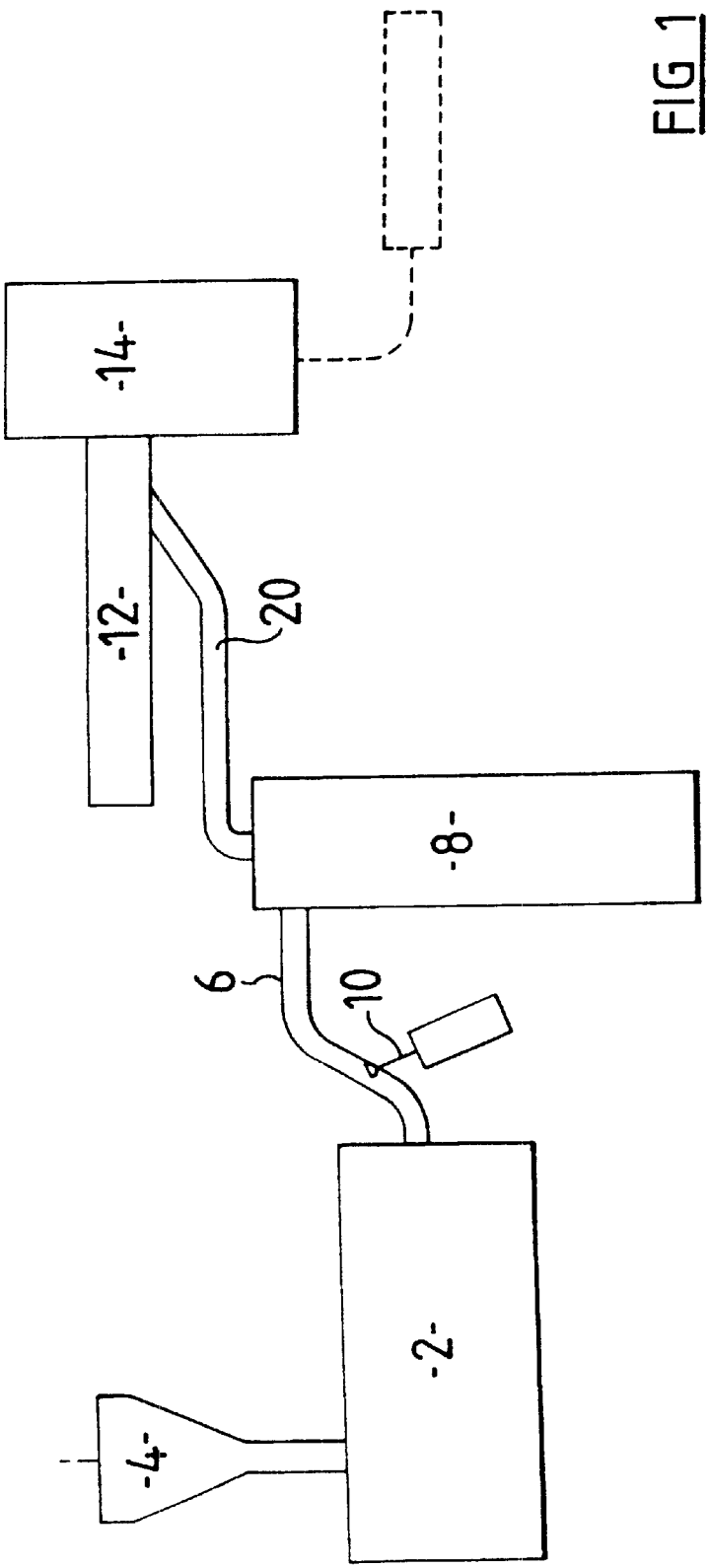

The present invention relates to the manufacture of moulded plastics products and more particularly to the manufacture of plastics products of substantial size and weight. More specifically, but not exclusively, the invention relates to the manufacture of plastics products from post-consumer recycled plastics waste.

Conventional plastics injection moulding techniques traditionally involve the use of high injection pressures. The mould must be capable of withstanding the injection pressures involved and as a result when articles of relatively large size are being produced the cost of the injection equipment and mould is very substantial.

Traditional injection moulding equipment which relies on the use of relatively narrow runners leading into the mould requires the use of virgin plastic or recycled plastic that is substantially free of foreign matter likely to interfere with the injection process. Post-consumer recycled plastic is likely to contain particles of metal glass or stone which for most traditional injection moulding methods must be removed prior to re-use of the recycled plastics. The processing required to ensure that the recycled plastics is substantially free of foreign matter further adds to the cost of processing which may make the cost of using recycled plastics not commercially worthwhile.

The present invention seeks to provide a method and apparatus for relatively low pressure injection moulding of large plastics articles in one shot possibly using post-consumer recycled plastics which may still contain particles of foreign matter.

According to the present invention, there is provided a method of injection moulding a plastics article under relatively low injection pressures, comprising feeding plastics material from an extruder into an accumulator, and displacing the extrudate from the accumulator into a mould via a valve leading into the mould cavity, the valve having a valve piston which at the end of injection closes the mould cavity substantially at the mould surface.

In a preferred embodiment of the invention, during injection of extrudate from the accumulator into the mould cavity the extruder continues in operation to provide further extrudate for use in the same injection cycle.

The extruder may be fed with plastics material composed at least partially of post-consumer recycled plastics, the valve passage being of a size such that it will not be blocked by stones or other particulate foreign matter which might be present within the material. The relatively large cross-sectional area of the valve passage also provides relatively low pressure, but high volumetric flow, of injection into the mould cavity. Advantageously, filling of the mould with the required amount of plastics material is determined by sensing of pressure within the mould cavity.

According to another aspect of the invention, there is provided an injection moulding system for single shot injection moulding of large plastics components, comprising an extruder, and an accumulator fed from the extruder, the accumulator leading into the mould via a mould valve operative when closed to close the mould cavity substantially at the mould surface and also to close an outlet from the accumulator.

In a preferred embodiment of the invention, the accumulator comprises an accumulator cylinder having a piston operative to inject extrudate into the mould, and the mould valve comprises a valve member in the form of a piston within a tubular valve passage terminating in an injection nozzle lying within the mould cavity, the valve piston having an end face which, in the closed condition of the valve, lies substantially at the outlet end of the injection nozzle and seats within the nozzle. Advantageously, an outlet from the accumulator branches into the valve passage, and, in the closed condition of the mould valve, a side wall of the piston closes the outlet at the position at which it branches into the valve passage.

Still further according to the invention, there is provided a system for injection moulding relatively large plastics articles, comprising an extruder, an accumulator coupled to an outlet from the extruder, the accumulator leading into a mould via a mould valve having a passage of relatively large cross-sectional size whereby to effect injection at relatively low injection pressures, and means for sensing a mould-full condition to effect closure of the mould valve by sensing the pressure of injected material at one or more positions within the mould cavity.

Figure 2:
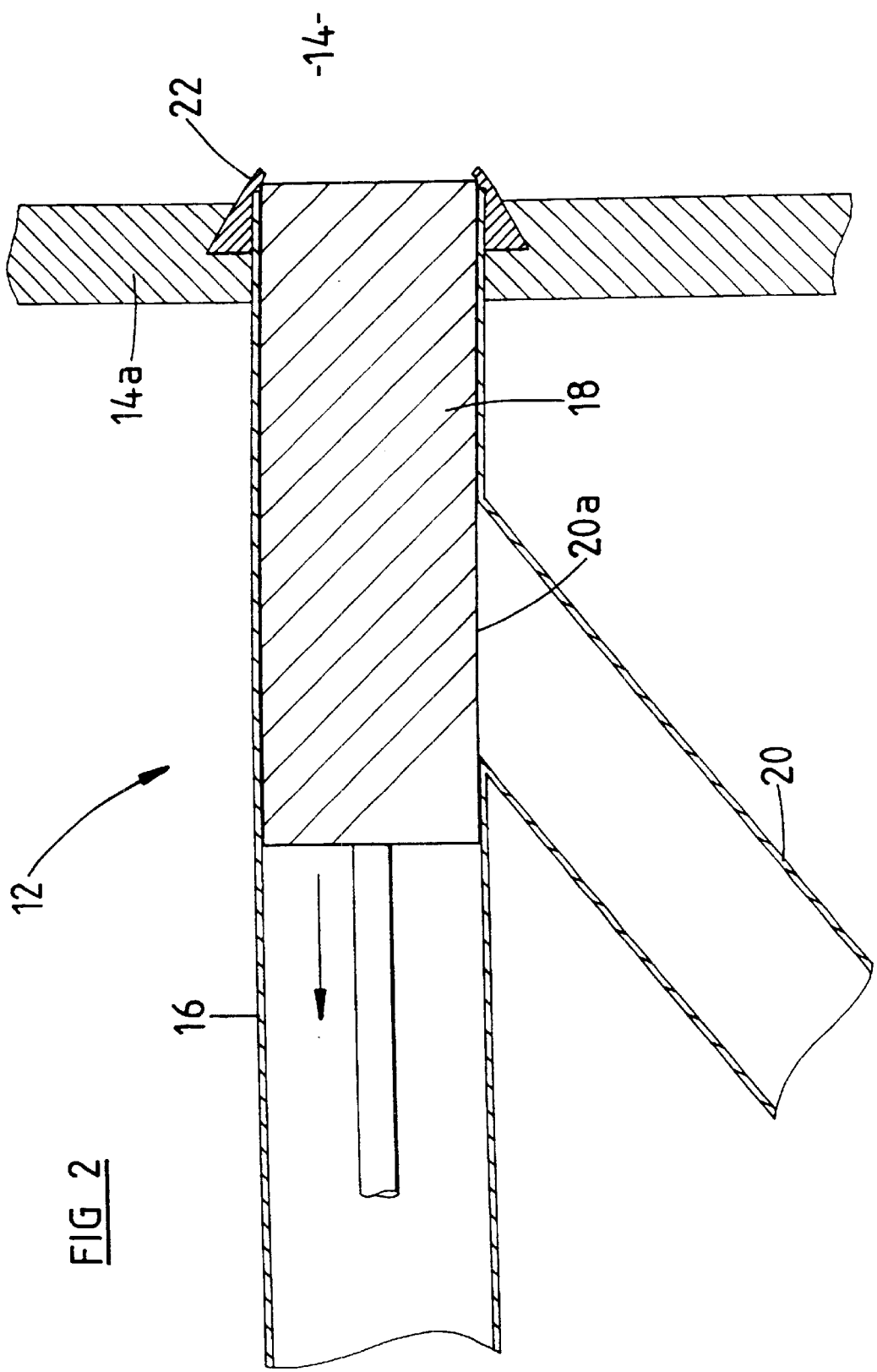

An embodiment of the invention will now be described, by way of example only, with reference to the accompanying drawings, in which:

FIG. 1 shows schematically an injection moulding system in accordance with a preferred embodiment of the invention for one shot injection moulding of large plastics articles; and FIG. 2 shows schematically and to an enlarged scale a mould valve within the system of FIG. 1 and illustrating the relationship between the mould valve and the mould cavity in a closed condition of the valve.

The system shown in the accompanying drawings comprises an extruder 2 fed with raw plastics material via a suitable inlet device 4 which delivers a specific volume of raw material to the extruder 2 in order to keep the extruder loaded with plastics material at all times during operation of the extruder. The incoming plastics material may consist of post-consumer recycled plastics material shredded and comminuted in size and possibly mixed with recycled raw plastics material according to requirements. The extrudate from the extruder 2 passes via a heated transfer pipe 6 to an accumulator 8 which is preferably of hydraulic type; the transfer pipe 6 includes a pressure relief valve 10 loaded by an air cylinder. The accumulator 8 in its preferred form consists of a large capacity cylinder with a hydraulically-powered piston. Between injection shots, the cylinder is filled with extrudate from the extruder 2 and when the accumulator cylinder is filled the accumulator piston is actuated to inject extrudate via a mould valve 12 into the mould cavity 14. During this process the extruder 2 continues to operate whereby the mould cavity 14 is filled with extrudate previously stored in the accumulator 8 and also continually fed from the extruder 2 via the accumulator 8 during injection.

As shown in FIG. 2, the mould valve 12 comprises a tube 16 defining a valve passage in which is mounted a hydraulically-actuated piston 18. The tube 16 extends through the wall 14a of the mould into the mould cavity 14. A feed line 20 from the accumulator 8 branches into the tube 16 of the mould valve 12. In the open condition of the mould valve 12, the valve piston 18 is retracted to a position upstream of the branch inlet 20a from the feed line 20 to enable free passage of the extrudate into the mould cavity 14 via the tube 16 and via a heated nozzle 22 at the outlet end of the tube 16. In the closed condition of the mould valve 12 (as shown in FIG. 2) the piston 18 not only closes the branch inlet 20a from the accumulator feed line 20, but also extends via tube 16 into the mould cavity 14, the end of the valve piston 18 seating within the nozzle 22, whereby the nozzle 22 defines the seat for the valve piston 18 in its closed condition so that the end of the piston 8 shuts off the mould cavity substantially at the mould surface; i.e. the surface of the article being moulded. As a result, the moulding is not formed with any sprues which require post-forming finishing operations.

The tube 16 defining the valve passage and the injection nozzle 22 through which extrudate is injected into the mould are of relatively large diameter, typically of several centimetres or more up to about 10 centimetres diameter depending on the size of the mould, and are such that stones or similarly large particles of foreign matter possibly up to a size of 2–3 centimetres which might remain after shredding and comminution of incoming post-consumer plastics material, will not interfere with the injection process. The large cross-section of the injection system also facilitates a high volumetric flow rate at lower injection pressures than is conventional.

The system is particularly suitable for one shot moulding of plastics components of many tens of kilograms in weight, for example components of up to about 130 kilograms in weight. By way of illustrative example only, the system can be used for one shot moulding of load-carrying pallets. A typical injection pressure using the system of the preferred embodiment will be of the order of 400 pounds per square inch which is many times less than that used in conventional injection moulding processes.

Conventional injection moulding processes which operate using high injection pressures usually inject into the mould on a time basis or volumetric basis. Although either basis is likely to provide consistent results when operating at high injection pressures, it is unlikely to do so at the much lower injection pressures which take place using the system of the preferred embodiment of the present invention, particularly when using post-consumer recycled plastics as the extrudate itself will not always be consistent and may also be subject to some internal passing arising from foreign matter within the mix. To overcome this difficulty, one or more pressure sensors are incorporated at appropriate positions within the mould to sense build-up of internal pressure within the mould during injection. Complete filling of the mould will be determined by sensing of the required internal pressure within the mould cavity by the or each pressure sensor within the mould and at that point the mould valve 12 will be closed with the piston 18 of the valve closing directly onto the mould surface as previously discussed; injection from the accumulator 8 will also cease and the accumulator piston will be retracted to permit re-charging of the accumulator with extrudate in preparation for the next mould cycle. The number of pressure sensors within the mould and the positioning of the pressure sensors will be dependent on the volume of the mould and also the complexity of the mould shape.

As the system is operating at comparatively low injection pressures, the overall mould structure can be built to a lesser strength than that which would be needed if substantially higher injection pressures were being used and this, in turn, will lead to a significantly reduced mould cost. The relatively large volumetric injection flow rate at reduced pressures also results in absence of high back pressure onto the extruder whereby the extruder can operate at substantially constant speed throughout its cycle and without undergoing substantial stress variations throughout its cycle thus resulting in increased working life for the extruder.

It is to be understood that although the system described is particularly suitable for use with plastics composed at least partially of post-consumer recycled plastics it can also be used with raw plastics material.

Throughout this specification and claims which follow, unless the context requires otherwise, the word "comprise", and variations such as "comprises" or "comprising", will be understood to imply the inclusion of a stated integer or group of integers or steps but not the exclusion of any other integer or group of integers.

The embodiment has been described by way of example only and modifications are possible within the scope of the invention.

What is claimed is:

1. A method of injection moulding a plastics article, comprising feeding plastics material from an extruder into an accumulator, and displacing the extrudate from the accumulator into a mould via a valve leading into the mould cavity, the valve having a valve piston which, at the end of injection, closes the mould cavity substantially at the mould surface of the article whereby the moulding is formed without the presence of a sprue at the site of injection, and filling of the mould with the required amount of plastics material is determined during moulding by sensing pressure of the plastics material within the mould cavity, the valve being closed in response to a mould-full condition as determined by the same sensing pressure.

2. A method according to claim 1, wherein during injection of extrudate from the accumulator into the mould cavity the extruder continues in operation to provide further extrudate for use in the same injection cycle.

3. A method according to claim 2, wherein the injection pressure is of the order of several hundreds of pounds per square inch.

4. A method according to claim 1, wherein the extruder is fed with plastics material composed at least partially of post-consumer recycled plastics, the valve passage being of a size such that it will not be blocked by stones or other particulate foreign matter.

5. A method according to claim 1, wherein the valve piston also closes an outlet of the accumulator at the end of injection.

6. A method of injection moulding a plastics article, comprising feeding plastics material from an extruder into an accumulator, and displacing the extrudate from the accumulator into a mould via a valve leading into the mould cavity, the valve having a valve passage with a valve piston which at the end of injection closes the mould cavity substantially at the mould surface of the article whereby the moulding is formed without the presence of a sprue at the site of injection, the valve passage and piston being of a constant diameter of at least several centimeters, and filling of the mould with the required amount of plastics material is determined during moulding by sensing pressure of the plastics material within the mould cavity, the valve being closed in response to a mould-full condition as determined by the same sensing pressure.

7. An injection moulding system for single shot injection moulding of plastics components, comprising an extruder, an accumulator fed from the extruder, the accumulator leading into the mould via a mould valve operative, when closed, to close the mould cavity substantially at the mould surface whereby the moulding is formed without the presence of a sprue at the site of injection and also to close an outlet from the accumulator, and means for determining that a required amount of plastics material has been fed into the mould by sensing the pressure of injected material at one or more positions within the mould cavity, the valve being closed in response to a mould-full condition as determined by said pressure sensing.

8. A system according to claim 7, wherein the accumulator comprises an accumulator cylinder having a piston operative to inject extrudate into the mould, and the mould valve comprises a valve member in the form of a piston within a tubular valve passage terminating in an injection nozzle lying within the mould cavity, the valve piston having an end face which, in the closed condition of the valve, lies substantially at the outlet end of the injection nozzle and seats within the nozzle.

9. A system according to claim 8, wherein the outlet from the accumulator branches into the valve passage, and, in the closed condition of the mould valve, a side wall of the valve piston closes the accumulator outlet at the position at which it branches into the valve passage.

10. A system according to claim 7, wherein the valve passage and accumulator outlet are of a size such that they will not be blocked by stones or other particulate matter in the extrudate when at least partially composed of post-consumer recycled plastics.

11. A system for injection moulding plastics articles, comprising an extruder, an accumulator coupled to an outlet from the extruder, the accumulator leading into a mould via a mould valve having a passage of a cross-sectional size such that it will not be blocked by stones or other particulate foreign matter in the extrudate when at least partially composed of post-consumer recycled plastics, and means for determining that a required amount of plastics material has been fed into the mould by sensing the pressure of injected material at one or more positions within the mould cavity, the valve being oDerative to close the mould cavity substantially at the mould surface of the article whereby the moulding is formed without the presence of a sprue at the site of injection in response to a mould-full condition as determined by said pressure sensing.

12. A system according to claim 11, wherein the injection pressure is of the order of several hundreds of pounds per square inch.

13. A system according to claim 12, wherein the passage has a diameter of at least several centimeters.

* * * * *